(12) United States Patent
Walsh

(10) Patent No.: US 9,751,288 B2
(45) Date of Patent: Sep. 5, 2017

(54) SYSTEMS AND METHODS FOR FORMING LAMINATES

(71) Applicant: Graphic Packaging International, Inc., Atlanta, GA (US)

(72) Inventor: Joseph C. Walsh, Boulder, CO (US)

(73) Assignee: Graphic Packaging International, Inc., Atlanta, GA (US)

( * ) Notice: Subject to any disclaimer, the term of this patent is extended or adjusted under 35 U.S.C. 154(b) by 86 days.

(21) Appl. No.: 14/978,127

(22) Filed: Dec. 22, 2015

(65) Prior Publication Data

US 2016/0176179 A1    Jun. 23, 2016

Related U.S. Application Data

(60) Provisional application No. 62/124,563, filed on Dec. 22, 2014.

(51) Int. Cl.
*B29C 65/48* (2006.01)
*B29C 65/52* (2006.01)
(Continued)

(52) U.S. Cl.
CPC .......... *B32B 37/1292* (2013.01); *B32B 27/36* (2013.01); *B32B 37/203* (2013.01);
(Continued)

(58) Field of Classification Search
USPC ....... 156/247, 249, 538, 539, 553, 555, 578, 156/580, 581, 582
See application file for complete search history.

(56) References Cited

U.S. PATENT DOCUMENTS 3,807,020 A    4/1974  Van Raevels
3,867,225 A *  2/1975  Nystrand ............... B31F 1/07
                                                  156/209

(Continued)

FOREIGN PATENT DOCUMENTS

EP    1 796 988       2/2012
JP    05314888       11/1993
(Continued)

OTHER PUBLICATIONS

International Search Report and Written Opinion of the International Search Authority from International Application No. PCT/US2012/049273, mailed Feb. 28, 2013.
(Continued)

*Primary Examiner* — Sing P Chan
(74) *Attorney, Agent, or Firm* — Womble Carlyle Sandridge & Rice, LLP

(57) ABSTRACT

A method for forming a laminate can comprise moving an initial laminate and a sacrificial web at least partially coated with an adhesive in a downstream direction. The initial laminate can comprise a base web and an interactive web comprising a retained section and a scrap section. The method also can comprise forming a compound laminate by nipping the sacrificial web and at least the scrap section of the interactive web between a raised feature of a nip roller and an opposing support surface so that the adhesive at least partially bonds the sacrificial web to the scrap section. In addition, the method can comprise separating the compound laminate into a resultant laminate, comprising the base web and at least the retained section of the interactive web, and a sacrificial laminate, comprising the sacrificial web and at least the scrap section of the interactive web.

23 Claims, 6 Drawing Sheets

(51) Int. Cl.
  *B32B 37/02* (2006.01)
  *B32B 37/12* (2006.01)
  *B32B 38/04* (2006.01)
  *B32B 38/10* (2006.01)
  *B32B 27/36* (2006.01)
  *B32B 37/20* (2006.01)
  *B32B 38/06* (2006.01)
  *B32B 38/00* (2006.01)
  *B32B 37/26* (2006.01)

(52) U.S. Cl.
  CPC ............ *B32B 38/06* (2013.01); *B32B 38/145* (2013.01); *B32B 2037/268* (2013.01); *B32B 2309/70* (2013.01); *B32B 2367/00* (2013.01); *B32B 2439/70* (2013.01); *B32B 2509/00* (2013.01)

(56) References Cited

U.S. PATENT DOCUMENTS

| | | | |
|---|---|---|---|
| 4,012,552 A | 3/1977 | Watts | |
| 4,306,367 A | 12/1981 | Otto | |
| 4,324,823 A | 4/1982 | Ray, III | |
| 4,490,409 A | 12/1984 | Nablo | |
| 4,495,232 A | 1/1985 | Bauser et al. | |
| 4,605,461 A | 8/1986 | Ogi | |
| 4,676,857 A | 6/1987 | Scharr et al. | |
| 4,725,473 A * | 2/1988 | Van Gompel | A61F 13/51464 156/209 |
| 4,775,771 A | 10/1988 | Pawlowski et al. | |
| 4,847,134 A * | 7/1989 | Fahrenkrug | A61F 13/15203 156/163 |
| 4,865,921 A | 9/1989 | Hollenberg et al. | |
| 4,890,439 A | 1/1990 | Smart et al. | |
| 4,891,258 A * | 1/1990 | Fahrenkrug | A61F 13/15203 428/131 |
| 4,936,935 A | 6/1990 | Beckett | |
| 4,963,424 A | 10/1990 | Beckett | |
| 5,039,364 A | 8/1991 | Beckett et al. | |
| 5,095,186 A | 3/1992 | Russell et al. | |
| 5,117,078 A | 5/1992 | Beckett | |
| 5,153,042 A | 10/1992 | Indrelie | |
| 5,213,902 A | 5/1993 | Beckett | |
| 5,221,419 A | 6/1993 | Beckett | |
| 5,260,537 A | 11/1993 | Beckett | |
| 5,266,386 A | 11/1993 | Beckett | |
| RE34,683 E | 8/1994 | Maynard et al. | |
| 5,340,436 A | 8/1994 | Beckett | |
| 5,354,973 A | 10/1994 | Beckett | |
| 5,376,198 A * | 12/1994 | Fahrenkrug | A61F 13/15203 156/163 |
| 5,410,135 A | 4/1995 | Pollart et al. | |
| 5,424,517 A | 6/1995 | Habeger, Jr. et al. | |
| 5,519,195 A | 5/1996 | Keefer et al. | |
| 5,628,921 A | 5/1997 | Beckett | |
| 5,672,407 A | 9/1997 | Beckett | |
| 5,744,219 A | 4/1998 | Tahara | |
| 5,759,422 A | 6/1998 | Schmelzer et al. | |
| 5,800,724 A | 9/1998 | Habeger et al. | |
| 5,820,971 A | 10/1998 | Kaule et al. | |
| 5,830,529 A | 11/1998 | Ross | |
| 6,033,513 A * | 3/2000 | Nakamura | B05C 1/0813 118/211 |
| 6,074,480 A * | 6/2000 | Kakuta | B05C 1/165 118/249 |
| 6,114,679 A | 9/2000 | Lai et al. | |
| 6,150,646 A | 11/2000 | Lai et al. | |
| 6,171,429 B1 | 1/2001 | Aindow | |
| 6,204,492 B1 | 3/2001 | Zeng et al. | |
| 6,207,268 B1 | 3/2001 | Kosaka | |
| 6,214,444 B1 | 4/2001 | Uchibori | |
| 6,251,451 B1 | 6/2001 | Zeng | |
| 6,267,052 B1 | 7/2001 | Hill | |
| 6,294,241 B1 | 9/2001 | Kaule | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,677,563 B2 | 1/2004 | Lai | |
| 6,717,121 B2 | 4/2004 | Zeng et al. | |
| 6,765,182 B2 | 7/2004 | Cole et al. | |
| 6,919,547 B2 | 7/2005 | Tsontzidis | |
| RE39,044 E | 3/2006 | Ross | |
| 7,118,796 B2 * | 10/2006 | Schulz | B31F 1/07 162/109 |
| 7,319,213 B2 | 1/2008 | Tsontzidis | |
| 7,335,274 B2 | 2/2008 | Aso | |
| 7,930,822 B2 | 4/2011 | Nakanishi | |
| 8,158,047 B2 * | 4/2012 | Schulz | B31F 1/07 156/209 |
| 8,562,025 B2 | 10/2013 | Drinkwater | |
| 8,753,737 B2 * | 6/2014 | McNeil | B32B 5/26 162/109 |
| 9,208,428 B2 | 12/2015 | Feder | |
| 9,216,564 B2 | 12/2015 | Walsh et al. | |
| 2002/0018880 A1 | 2/2002 | Young | |
| 2002/0112618 A1 | 8/2002 | Bailey | |
| 2003/0085224 A1 | 5/2003 | Tsontzidis | |
| 2004/0102125 A1 * | 5/2004 | Morman | B32B 5/00 442/394 |
| 2005/0098281 A1 * | 5/2005 | Schulz | B31F 1/07 162/117 |
| 2005/0211369 A1 | 9/2005 | Aso | |
| 2005/0243391 A1 | 11/2005 | Drinkwater | |
| 2006/0011620 A1 | 1/2006 | Tsontzidis | |
| 2006/0108359 A1 | 5/2006 | Brough | |
| 2006/0283538 A1 * | 12/2006 | Schulz | B31F 1/07 156/219 |
| 2007/0051467 A1 | 3/2007 | Aso | |
| 2007/0077511 A1 | 4/2007 | Tredwell | |
| 2007/0187946 A1 | 8/2007 | Shaieb | |
| 2007/0214637 A1 | 9/2007 | Nakanishi | |
| 2007/0215611 A1 | 9/2007 | O'Hagan et al. | |
| 2008/0230176 A1 | 9/2008 | Van De Weijer et al. | |
| 2009/0250522 A1 | 10/2009 | Williams | |
| 2009/0302032 A1 | 12/2009 | Middleton | |
| 2009/0322538 A1 | 12/2009 | Kobren et al. | |
| 2010/0028621 A1 * | 2/2010 | Byrne | B31F 1/07 428/195.1 |
| 2010/0297377 A1 * | 11/2010 | McNeil | B32B 5/26 428/43 |
| 2011/0024947 A1 * | 2/2011 | Schulz | B31F 1/07 264/284 |
| 2011/0123773 A1 * | 5/2011 | Lofink | B31F 1/07 428/166 |
| 2011/0127257 A1 | 6/2011 | Lai | |
| 2011/0209749 A1 | 9/2011 | Yang | |
| 2012/0244241 A1 * | 9/2012 | McNeil | B31F 1/07 425/336 |
| 2013/0032283 A1 | 2/2013 | Walsh et al. | |
| 2013/0049349 A1 | 2/2013 | Feder | |
| 2013/0134698 A1 | 5/2013 | Mayrhofer | |
| 2013/0161938 A1 | 6/2013 | Mayrhofer | |
| 2013/0269865 A1 | 10/2013 | Drinkwater | |
| 2014/0238596 A1 * | 8/2014 | McNeil | B32B 5/26 156/292 |
| 2014/0242320 A1 * | 8/2014 | McNeil | B32B 5/26 428/43 |
| 2015/0086751 A1 | 3/2015 | Robbins | |

FOREIGN PATENT DOCUMENTS

WO  WO 2005/068321   7/2005
WO  WO 2006/052785   5/2006

OTHER PUBLICATIONS

Office Action for U.S. Appl. No. 13/565,195, dated Apr. 18, 2014.
Response to Restriction Requirement for U.S. Appl. No. 13/565,195, dated Jun. 18, 2014.
Office Action for U.S. Appl. No. 13/565,195, dated Jul. 16, 2014.

(56) References Cited

OTHER PUBLICATIONS

Amendment and Response for U.S. Appl. No. 13/565,195, filed Oct. 2, 2014.
Office Action for U.S. Appl. No. 13/565,195, dated Oct. 23, 2014.
Request for Continued Examination (RCE) Transmittal for U.S. Appl. No. 13/565,195, dated Jan. 23, 2015.
Amendment and Response to Final Office Action for U.S. Appl. No. 13/565,195, filed Jan. 23, 2015.
Office Action for U.S. Appl. No. 13/565,195, dated Feb. 6, 2015.
Amendment and Response to Office Action for U.S. Appl. No. 13/565,195, dated May 6, 2015.
Office Action for U.S. Appl. No. 13/565,195, dated May 18, 2015.
Amendment and Response to Final Office Action for U.S. Appl. No. 13/565,195, dated Aug. 7, 2015.
Notice of Allowance and Fee(s) Due for U.S. Appl. No. 13/565,195, dated Aug. 20, 2015.
Part B—Fee(s) Transmittal for U.S. Appl. No. 13/565,195, dated Nov. 13, 2015.
Issue Notification for U.S. Appl. No. 13/565,195, dated Dec. 2, 2015.
International Search Report and Written Opinion for PCT/US2015/067329 dated Apr. 22, 2016.

* cited by examiner

SYSTEMS AND METHODS FOR FORMING LAMINATES

CROSS-REFERENCED TO RELATED APPLICATIONS

This application claims the benefit of U.S. Provisional Patent Application No. 62/124,563, filed on Dec. 22, 2014.

INCORPORATION BY REFERENCE

The disclosures of U.S. patent application Ser. No. 13/565,195, which was filed on Aug. 2, 2012, and U.S. Provisional Patent Application No. 62/124,563, which was filed on Dec. 22, 2014, are hereby incorporated by reference for all purposes as if presented herein in their entirety.

BACKGROUND OF THE DISCLOSURE

The present disclosure generally relates to systems and methods for making laminates that may include patterned microwave energy interactive material and may be formed into constructs, such as blanks, cartons, press-formed constructs, or the like.

SUMMARY OF THE DISCLOSURE

In general, one aspect of the disclosure is directed to a method for forming a laminate. The method can comprise moving an initial laminate and a sacrificial web in a downstream direction. The initial laminate can comprise a base web and an interactive web, the interactive web comprising a retained section and a scrap section, and the sacrificial web being at least partially coated with an adhesive. The method further can comprise receiving the sacrificial web and the initial laminate between a nip roller and an opposing support surface. The nip roller can comprise a raised feature and a recess. The method also can comprise forming a compound laminate comprising the sacrificial web and the initial laminate, the forming the compound laminate comprising nipping the sacrificial web and at least the scrap section of the interactive web between the raised feature of the nip roller and the opposing support surface so that the adhesive at least partially bonds the sacrificial web to the scrap section. In addition, the method can comprise separating the compound laminate into a resultant laminate and a sacrificial laminate. The resultant laminate can comprise the base web and at least the retained section of the interactive web, and the sacrificial laminate can comprise the sacrificial web and at least the scrap section of the interactive web.

In another aspect, the disclosure is generally directed to a system for forming a laminate. The system can comprise a nip roller comprising a raised feature and a recess and an opposing support surface disposed opposite the nip roller. The nip roller and the opposing support surface can be for receiving an initial laminate and a sacrificial web between the nip roller and the opposing support surface. The initial laminate can comprise a base web and an interactive web, the interactive web can comprise a retained section and a scrap section, and the sacrificial web can be at least partially coated with an adhesive. The raised portion of the nip roller is for being generally aligned with the scrap section of the interactive web so that the sacrificial web is nipped to at least a portion of the scrap section. The system further can comprise a peel-away apparatus for separating the sacrificial web and the scrap section from the base web and the retained section.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure. The drawings are schematic and exemplary only, and should not be construed as limiting the invention.

Corresponding parts are designated by corresponding reference numbers throughout the drawings.

DETAILED DESCRIPTION OF THE EXEMPLARY EMBODIMENTS

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the invention.

One aspect of this disclosure is the provision of systems and methods for providing a laminate, wherein the laminate may be formed into a construct for use in cooking and/or reheating food in a microwave oven, the laminate includes both microwave transparent and microwave energy interactive materials, and the microwave energy interactive material may be formed into a pattern. In one example, portions of the microwave energy interactive material may be cut and removed during intermediate steps in the lamination processes, so that the remaining microwave energy interactive material in the resultant laminate is arranged in the pattern. In one embodiment, the pattern may be formed without using chemical etching or chemical deactivation. In one embodiment, the cutting and removing of the predetermined pieces of the microwave energy interactive material may be used to form an initial (e.g., coarse) pattern in the microwave energy interactive material, and the initial pattern may be fine tuned or otherwise transformed into a subsequent (e.g., fine) pattern using any suitable technique, such as chemical deactivation and/or chemical etching. Further regarding the removal of the portions of the microwave energy interactive material, a compound laminate may be separated (e.g., delaminated) into parts, and one of the parts may be a sacrificial laminate that includes the removed portions of the microwave energy interactive material.

Figure 1:
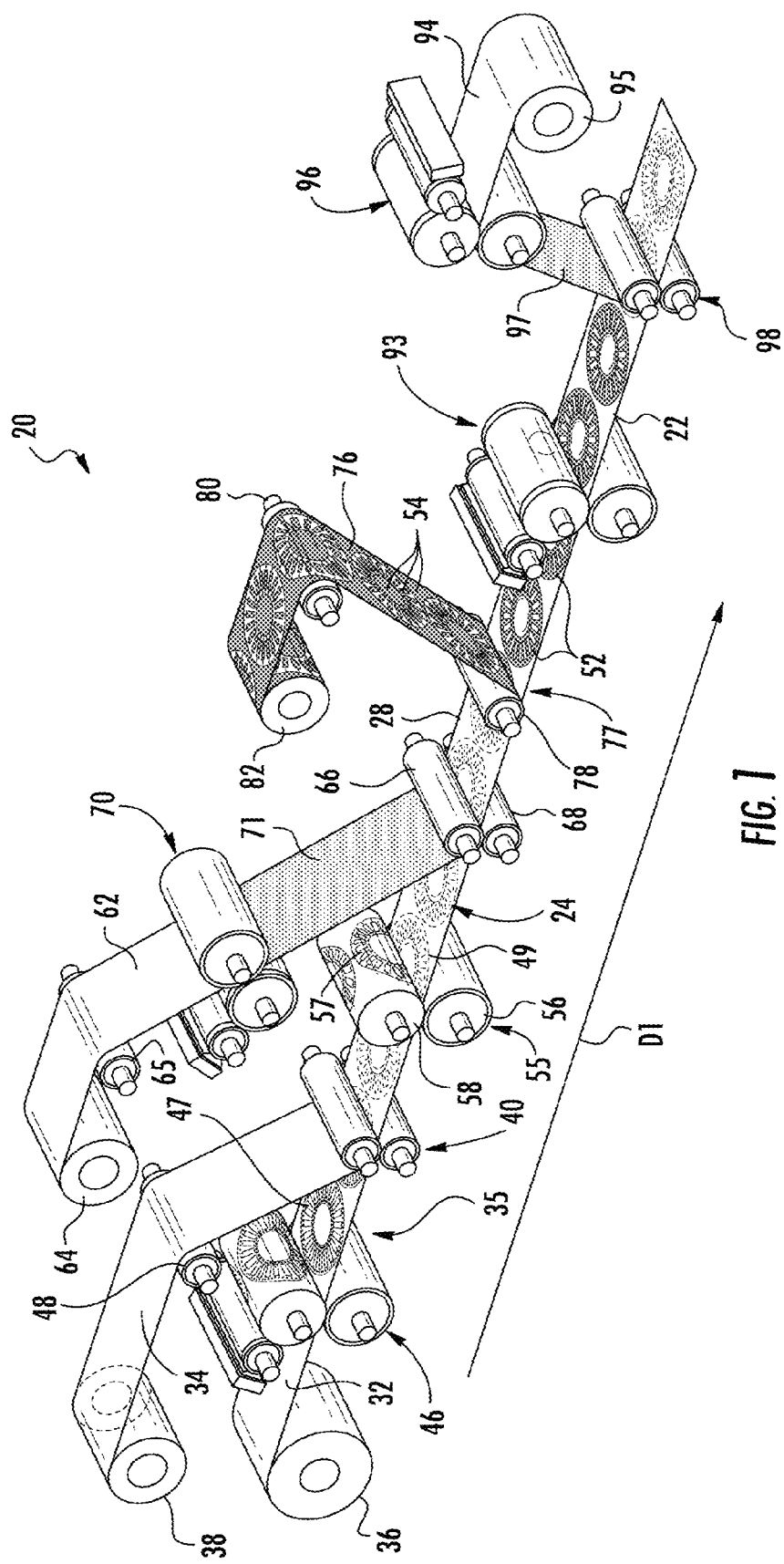
FIG. 1 is a schematic perspective view of a system for forming a resultant laminate in accordance with a first exemplary embodiment of the disclosure.
Figure 2:
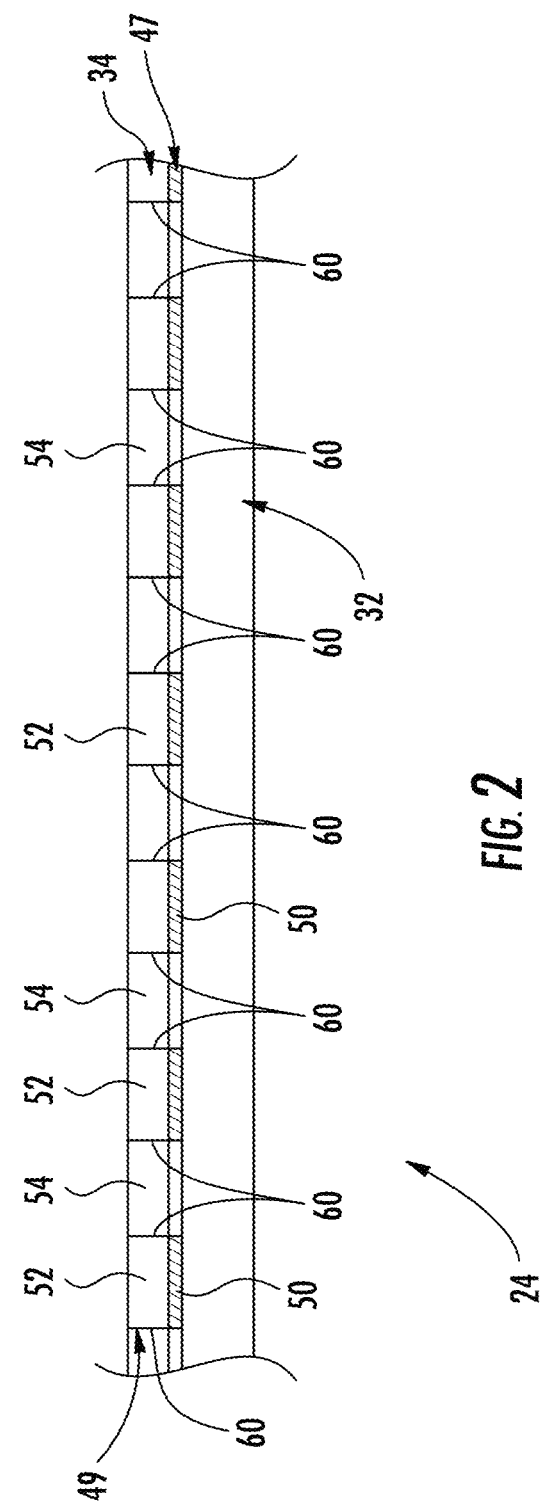
FIG. 2 is a schematic side elevation view of a section of an initial laminate, wherein the initial laminate is a precursor to the resultant laminate, in accordance with the first embodiment.
Figure 3:
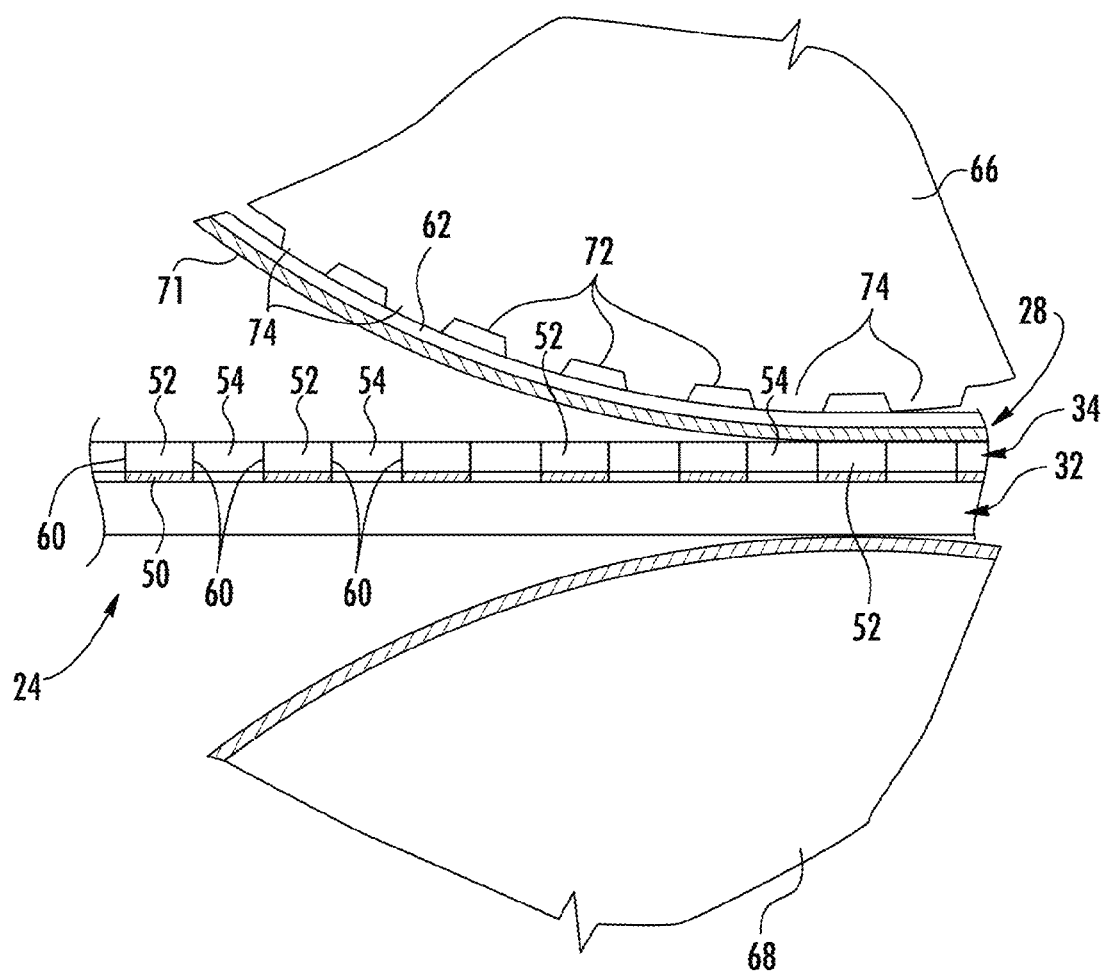
FIG. 3 is a schematic side elevation view of a laminate being nipped between nip rollers, wherein the top nip roller includes raised features and recesses.

Referring now in greater detail to the drawings, initially FIG. 1, a system 20 and associated methods of a first embodiment of this disclosure are described in the following. In the illustrated embodiment, the system 20 can have a downstream direction D1 (FIG. 1). In accordance with one aspect of this disclosure, the system 20 and associated methods may be utilized in the fabrication of a resulting or resultant laminate 22 (FIG. 1) comprising both microwave transparent and microwave energy interactive materials. In the resultant laminate 22, the microwave energy interactive material may be configured in predetermined shapes that define a pattern, so that the shapes/pattern affect the operativeness of the microwave energy interactive material. As shown in FIG. 1, the pattern of the microwave energy interactive material is shown schematically. In the system 20 of the first embodiment, there are several stages respectively associated with laminates that are precursors to the resultant laminate 22. The precursor laminates may include an initial laminate 24 (FIGS. 1-3). The initial laminate and/or the resultant laminate 22 could be otherwise configured without departing from the disclosure. For example, the microwave energy interactive material could be replaced by a different material and system 20 and associated methods could form a resultant laminate with the alternative material configured in predetermined shapes that define a pattern.

The initial laminate 24 comprises a web of base material 32 and a web comprising microwave energy interactive material 34 that are secured together (FIG. 2). For ease of readability, the web of base material 32 may be referred to as a base web 32 in the following. Similarly, the web comprising microwave energy interactive material 34 may be referred to as an interactive web 34 in the following.

In one embodiment, the base web 32 can be suitable for being formed into constructs such as, but not limited to, blanks, cartons, trays, bowls, press-formed constructs, or the like, that may include microwave energy interactive material. As a more specific example, the base web 32 may be suitable for being cut into blanks that are for being formed into the constructs that may include microwave energy interactive material and may be used in cooking and/or reheating food in a microwave oven. In accordance with the first embodiment, the base web 32 is paperboard, or alternatively cardboard, although any other suitable material may be used.

In one example, the interactive web 34 may be a web of foil, wherein the foil is a thin sheet of metal such as, but not limited to, aluminum. As a more general example, the interactive web 34 may be a web of foil having a thickness sufficient to reflect at least a portion (and up to 100%) of impinging microwave energy. Such webs of foil can be formed from a conductive, reflective metal or metal alloy, for example, aluminum, copper, or stainless steel, generally having a thickness of from about 0.000285 inches to about 0.005 inches, for example, from about 0.0003 inches to about 0.003 inches. Such webs of foil may more specifically have a thickness of from about 0.00035 inches to about 0.002 inches, for example, 0.0016 inches. Other webs could be used without departing from the disclosure.

In another example, the interactive web 34 may comprise a web of foil (e.g., the web of foil discussed above) joined to a substrate, for example, paper or paperboard (i.e., a foil laminate). The foil may be joined to the substrate in any suitable manner, for example, using a substantially continuous layer or any other suitable arrangement of adhesive material. Such a foil laminate may have greater dimensional stability and, therefore, may be easier to process (e.g., unwind, kiss cut, etc.). The foil that is or is part of the interactive web 34 may be referred to as layer of microwave interactive material. The microwave interactive material may be for influencing the effect of the microwave energy on a food product being heated in association with a construct formed from a section of the resultant laminate 22. Such a construct may be formed in a conventional or other suitable manner.

The initial laminate 24 is formed at an upstream laminating station 35 of the system 20. For example, the base and interactive webs 32, 34 can be drawn from respective supply rolls 36, 38, such as in response to operation of one or more pairs of nip rollers 40, so that the base and interactive webs 32, 34 are nipped together between the upstream nip rollers 40. As shown in FIG. 1, one or more guide features (e.g., a guide roller 48) can help direct the interactive web 34 to be received with the base web 32 between the nip rollers 40 for nipping the interactive web 34 and the base web 32 together to form the initial laminate 24. When the interactive web 34 comprises a foil laminate, the foil laminate 34 may be configured so that the substrate faces towards the base web 32 or away from the base web 32 (e.g., so that the foil is positioned between substrate and the base web 32). For example, it may be desirable in some microwave heating products to conceal, partially conceal or mask the color (e.g., silver) of the foil. In other applications, it may be desirable to provide a particular appearance on the visible side of the resultant laminate. In such applications, the foil laminate 34 may be configured so that the foil faces the base web 32 and the substrate (e.g. paper) faces outwardly. The substrate may be white, black, or otherwise colored, patterned, and/or provided with text and/or graphics, as desired, using any suitable technique. Alternatively, it may be desirable in some microwave heating products to have the foil be visible, or it may be easier to adhere the substrate to the base web 32 in some processes. In such instances, the foil laminate 34 may be configured so that the substrate (e.g. paper) faces the base web 32 and the foil faces outwardly.

Prior to the nipping between the upstream nip rollers 40, one or more adhesive applicators 46 may apply adhesive material to what will become the inner face of the base web 32 (as shown in FIG. 1) and/or what will become the inner face of the interactive web 34. The one or more adhesive applicators 46 apply the adhesive material in a manner so that there is a predetermined pattern of adhesive material 47 between the base and interactive webs 32, 34 in the initial laminate 24. In accordance with the exemplary embodiment, the adhesive pattern 47 between the base and interactive webs 32, 34 may correspond or substantially correspond in shape to the pattern of the microwave energy interactive material in the resultant laminate 22, or any other suitable adhesive pattern may be used.

Any suitable adhesive material may be supplied by the one or more adhesive applicators 46. For example, the one or more adhesive applicators 46 may supply wet-bond adhesive material, in which case the adhesive material will be tacky during the nipping between the upstream nip rollers 40. Optionally, any suitable drying system (not shown), such as a drying oven, may be positioned downstream from the upstream nip rollers 40 for at least aiding in the drying of the adhesive material of the initial laminate 24. The adhesive material supplied from the adhesive applicator(s) 46 is dried and/or cured so that the base and interactive webs 32, 34 are bonded together where the adhesive is disposed between the webs 32, 34 according to the predetermined pattern of adhesive 47. Throughout this disclosure, each of the adhesive materials that are discussed may be applied with any suitable adhesive applicators, such as, but not limited to, patterned roll-on applicators (e.g., as shown in FIG. 1); patterned stamp applicators; movable, computer-controlled nozzle applicators, or the like. Also, each of the adhesive materials may be dried or otherwise cured in any suitable manner.

In the initial laminate 24, the adhesive pattern between the base and interactive webs 32, 34 defines both bonded and unbonded areas. More specifically and referring to the schematic cross-sectional view of FIG. 2, the segments of the adhesive material ("adhesive segments 50") of the adhesive pattern 47 between the base and interactive webs 32, 34 define bonded areas of the initial laminate 24. Accordingly, in each of the bonded areas, the adjacent surfaces of the base and interactive webs 32, 34 are bonded together by a respective adhesive segment 50. In at least FIG. 2, the adhesive segments 50 are schematically at least partially illustrated by hatching. The adhesive segments 50 indirectly define the unbonded areas of the initial laminate 24 so that, in each of the unbonded areas, the adjacent surfaces of the base and interactive webs 32, 34 could be in opposing face-to-face relation (e.g., opposing face-to-face contact) with one another, but generally are not bonded to one another. Accordingly, in the initial laminate 24, there are both: sections of the interactive web 34 that are bonded to the base web 32, and sections of the interactive web 34 that are not bonded to the base web 32. The sections of the interactive web 34 that are bonded to the base web 32 may be generally referred to as bonded interactive sections. More specifically and for reasons that will become more apparent in the following, the sections of the interactive web 34 that are bonded to the base web 32 may be more specifically referred to as retained interactive sections 52 (broadly: retained sections). Also for reasons that will become more apparent in the following, the sections of the interactive web 34 that are not bonded to the base web 32 may be referred to as unretained interactive sections and/or scrap interactive sections 54 (broadly: scrap sections). While the adhesive pattern 47 is shown in the schematic of FIG. 2 with a plurality of adhesive segments 50 forming a plurality of retained interactive sections 52 and scrap interactive sections 54, the adhesive pattern can form one or more adhesive segments, one or more retained interactive sections 52, and/or one or more scrap interactive sections 54 (e.g., the pattern could include a plurality of scrap interactive sections 54 interspersed with a plurality of retained interactive sections 52, the pattern could include a plurality of scrap interactive sections 54 and a single retained interactive section 52, the pattern could include a plurality of retained interactive sections 52 and a single scrap interactive section 54, and/or any other suitable combination).

As the initial laminate 24 moves in the downstream direction D1 from the upstream nip rollers 40, the initial laminate 24 can pass through a station (e.g., a cutting station) for forming lines of disruption in the interactive web 34. Even more specifically, kiss cuts may be formed in the initial laminate 24 through the action of any suitable cutting system or station 55. For example and not for purposes of limitation, a cutting station 55 as shown in FIG. 1 can include a counter roller 56 and a rotary cutter 58 that draw the initial laminate 24 therebetween. In one embodiment, the rotary cutter 58 may be in the form of a roller with outwardly projecting cutting features 57, such as cutting rules, cutting blades, or any other suitable cutting edges, configured for forming kiss cuts in the initial laminate 24, wherein the kiss cuts are arranged in a pattern 49 ("kisscut pattern"). The kiss cutting occurs on the side of the initial laminate 24 that is defined by the interactive web 34, and the kiss cuts typically extend completely through the interactive web 34 without substantially penetrating (e.g., without penetrating, or typically only slightly penetrating) the base web 32. (It is noted that where the interactive web 34 comprises a foil laminate, the kiss cuts typically extend through both the foil and the substrate (e.g., paper or paperboard).) Accordingly and referring to FIG. 2, the kiss cuts may be characterized as being die cuts 60 in the interactive web 34, such that the kisscut pattern 49 is defined by the die cuts 60. Each of the die cuts 60 may be more generally referred to as a line of separation such as, but not limited to, a slit, cut line, tear line, line of perforations, and/or the like. The kisscut pattern/die cuts 60 in the interactive web 34 may be formed in any suitable manner, such as with one or more rotary dies, flat dies, lasers, and/or the like, such that substantially only the interactive web 34 is cut.

Referring to FIG. 2, the die cuts 60 in the interactive web 34 at least partially define the retained and scrap interactive sections 52, 54 of the interactive web 34. More specifically, the die cuts 60 respectively substantially separate the retained and scrap interactive sections 52, 54 of the interactive web 34 from one another. Even more specifically, the die cuts 60 are such that each of the retained interactive sections 52 is substantially circumscribed (e.g., at least partially circumscribed) by the respective die cut (e.g., line of separation such as, but not limited to, a slit, cut line, tear line, line of perforations, and/or the like). The kisscut pattern 49 and the adhesive pattern 47 between the base and interactive webs 32, 34 may not be perfectly matched (e.g., may be slightly offset and/or comprise different sizes). For example, in one embodiment, a portion of one or more of the scrap interactive sections 54 could be bonded to the base web 32 and/or a portion of one or more of the retained interactive sections 52 could be unbonded to the base web 32.

As shown in FIGS. 1 and 3, a compound laminate 28 is formed at an intermediate laminating station of the system 20. The compound laminate 28 comprises the initial laminate 24 and a web of sacrificial material 62 that are secured together. For ease of readability, the web of sacrificial material 62 may be referred to as a sacrificial web 62 in the following. For example, the sacrificial web 62 may be a web of low-cost, disposable material, such as, but not limited to, a thin gauge polymer film, for example, a polyethylene film, or any other suitable material, such as a reused or recycled material.

In the illustrated embodiment, the sacrificial web 62 can be drawn from a supply roll 64 (FIG. 1), such as in response to operation of one or more nip rollers 66, 68, so that the initial laminate 24 and sacrificial web 62 are nipped together between the nip rollers 66, 68. As shown in FIG. 1, one or more guide features (e.g., a guide roller 65) can help direct the initial laminate 24 to be received with the sacrificial web 62 between the nip rollers 66, 68 for nipping the initial laminate 24 and the sacrificial web 62 together to form the compound laminate 28. In one embodiment, the sacrificial web 62 can include an adhesive 71 on some or all of the interior face (e.g., the face that is applied to the initial laminate 24). In one embodiment, the adhesive could be present on the sacrificial web 62 prior to unrolling the web from the supply roll 64. In the illustrated embodiment, as schematically shown in FIG. 1, prior to the nipping between the nip rollers 66, 68, one or more adhesive applicators 70 apply adhesive material 71 to what will become the inner face of the sacrificial web 62. In one embodiment, as shown in FIGS. 1 and 3, the adhesive applicator 70 can apply the adhesive material 71 generally homogenously or evenly on the inner surface of the sacrificial web 62. Alternatively, the adhesive applicator 70 could apply the adhesive material in a predetermined pattern that generally corresponds to the pattern of the scrap interactive sections 54 so that the adhesive generally extends only between the scrap interactive sections 54 and the sacrificial web 62. Such an adhesive pattern could be used, in one embodiment, in order to use less adhesive (e.g., in comparison to the homogenous coating of adhesive). Accordingly, in one embodiment, the adhesive 71 could be applied by the adhesive applicator 70 (e.g., including an applicator roller as shown in FIG. 1) or could be applied by any suitable applicator (e.g., by a sprayer; patterned stamp applicators; movable, computer-controlled nozzle applicators; or the like).

Any suitable adhesive material 71 may be supplied by the one or more adhesive applicators 70. For example, the one or more adhesive applicators 70 may supply a dry-bond adhesive material. As another example, the one or more adhesive applicators 70 may supply wet-bond adhesive material, in which case the adhesive material will typically be tacky during the nipping between the nip rollers 66, 68. Optionally, any suitable drying system (not shown), such as a drying oven, may be positioned downstream from the intermediate nip rollers 66, 68 for at least aiding in the drying of the adhesive material between the initial laminate 24 and the sacrificial web 62. The adhesive material supplied from the adhesive applicator(s) 70 is dried and/or cured so that the initial laminate 24 and sacrificial web 62 are bonded together. As one specific example, the adhesive material between the initial laminate 24 and the sacrificial web 62 may be curable by ultraviolet light, the sacrificial web 62 may be transparent and/or translucent, and the drying system may shine ultraviolet light onto the outer surface of the sacrificial web 62 for curing the adhesive material between the initial laminate 24 and the sacrificial web 62.

In the illustrated embodiment, while adhesive 71 can cover all or substantially all of the interior face of the sacrificial web 62, only the scrap interactive sections 54 are to be removed from the initial laminate 24. Accordingly, as schematically shown in FIG. 3, the top nip roller 66 can include features for selectively pressing the sacrificial web 62, the adhesive 71, the scrap interactive sections 54, and the base web 32 against the bottom nip roller 68 (e.g., the bottom nip roller 68 can be an opposing support feature and the surface of the bottom nip roller 68 can be an opposing support surface for the upper nip roller 66 and the raised features 74). These features can include one or more recesses 72 that define one or more raised features or bumps 74 on the surface of the nip roller 66. In the illustrated embodiment, the raised features 74 of the nip roller 66 press the sacrificial web 62 and the adhesive 71 against the initial web 24 in a predetermined pattern so that the scrap interactive sections 54 will become bonded to the sacrificial web 62 by the adhesive 71, and the retained interactive sections 52 do not, or more generally substantially do not, become bonded to the sacrificial web 62. The one or more recesses 72 generally can be aligned with the one or more retained interactive sections 52 and the one or more raised features 74 generally can be aligned with the one or more scrap interactive sections 54 so that as the sacrificial web 62 and the initial laminate 24 pass between the nip rollers 66, 68, the raised features 74 nip the sacrificial web 62 and the adhesive 71 against the scrap interactive sections 54. While the portions of the sacrificial web 62 and the adhesive 71 that are aligned with the recesses 72 may come in contact with the retained interactive sections 52, they generally are not pressed together by the nip rollers 66, 68 so that the sacrificial web 62 and the retained interactive sections 52 generally are not bonded together.

In one embodiment, the adhesive 71 could be a pressure sensitive adhesive (e.g., an adhesive that only forms a bond between surfaces when pressed between the surfaces, an adhesive that tends to form a more effective bond between surfaces when pressed between the surfaces, or any other suitable adhesive). Accordingly, the sacrificial web 62 is generally only bonded to the interactive web 34 where the raised features 74 in the nip roller 66 nip the sacrificial web 62 to the interactive web 34 since the pressure of the raised features 74 can help cause the adhesive 71 to form a bond between the portions of the sacrificial web 62 and the interactive web 34 that are nipped. Since the raised features 74 are generally aligned with the scrap interactive sections 54 of the interactive web 34, the sacrificial web 62 is only nipped to the scrap interactive sections 54 and the adhesive 71 generally only forms a bond between the scrap interactive sections 54 and the sacrificial web 34. In general, the retained interactive sections 52 are aligned with the recesses 72 in the nip roller 66, and the sacrificial web 62 is not nipped to the retained interactive sections 52 of the interactive web 34. Accordingly, the adhesive 71 generally is not activated to form a bond and/or forms a less effective bond between the sacrificial web 62 and the retained interactive sections 52. The adhesive 71 could be any other suitable adhesive without departing from the disclosure.

In one embodiment, the raised features 74 and recesses 72 of the nip roller 66 can form a pattern that rotates on the nip roller 66 in phase with the die cut pattern of the lines of disruption 60 in the initial laminate 24. For example, the raised features 74 (and/or other raised portions of the nip roller 66) generally can form a pattern on the nip roller 66 that generally matches that of the scrap material that is removed from the initial laminate 24 (e.g., the scrap interactive sections 54), and the recesses 72 generally can form a pattern on the nip roller 66 that generally matches the pattern of interactive material that is adhered to the base web 32 and is to remain on the resultant laminate 22 (e.g., the retained interactive sections 52). The raised features 74 generally can form a negative image pattern of the pattern of interactive material that is adhered to the base web 32 and is to remain on the resultant laminate 22. The raised features 74, the recesses 72, and/or other features of the nip roller 66 could be omitted or could be otherwise shaped, arranged, positioned, and/or configured without departing from the disclosure. Additionally, or alternatively, the bottom nip roller 68 could include features similar to the raised features 74 and/or recesses 72 of the top nip roller 66.

As shown in FIG. 1, the compound laminate 28 can move in the downstream direction D1 after passing between the nip rollers 66, 68 to a peel-away apparatus 77 that can separate (e.g., divide) the compound laminate 28 into a sacrificial laminate 76 and the resultant laminate 22. In the illustrated embodiment, the peel-away apparatus includes a peel-away roller 78 downstream from the nip rollers 66, 68 and one or more guide rollers 80. In the illustrated embodiment, after the scrap interactive sections 54 have become secured to the sacrificial web 62 by the raised features 74 of the nip roller 66, a sacrificial laminate 76 (FIG. 1), which comprises the scrap interactive sections 54 bonded to the sacrificial web 62, is stripped, separated, and/or delaminated from a remainder of the compound laminate 28. For example, the sacrificial laminate 76 may be stripped by drawing the sacrificial laminate around the peel-away roller 78 and the guide roller 80 in a direction that is at least partially transverse to the downstream direction D1, and forming the sacrificial laminate into a roll 82. The roll 82 may be characterized as being a conventional or other suitable winding apparatus for forming the sacrificial laminate 76 into a roll.

In the illustrated embodiment, as the sacrificial web 62 travels generally upwardly on the peel-away roller 78, the scrap interactive sections 54 remain adhered to the sacrificial web 62 by adhesive 71 since the scrap interactive sections 54 are not adhered to the base web 32 by the adhesive segments 50. Accordingly, the scrap interactive sections 54 are removed from the resultant laminate 22 by the sacrificial web 62 (FIG. 1). Additionally, as shown in FIG. 1, the retained interactive sections 52, which are bonded to the base web 32 and generally are not bonded to the sacrificial web 62 as described above, remain adhered to the base web 32 as the resultant laminate 22 moves in the downstream direction D1 from the peel-away apparatus 77. In the illustrated embodiment, the retained interactive sections 52 of the resultant laminate 22 are schematically shown in a shaded pattern (e.g., a "positive" pattern) downstream from the peel-away apparatus 77, and the scrap interactive sections 54 of the sacrificial web 76 are schematically shown in a shaded pattern that is the inverse or negative of the pattern of the retained interactive sections 52. The resultant laminate 22, the sacrificial laminate 76, the retained interactive sections 52, and/or the scrap sections 54 could be otherwise formed, or could be otherwise shaped, arranged, positioned, and/or configured without departing from the disclosure.

The resultant laminate 22 may continue to move in the downstream direction D1 for additional processing (e.g., additional lamination, addition of printed materials and/or colorings, cutting and/or scoring, formation into a container or other construct, etc.). For example, in one embodiment, the resultant laminate 22 can be received in a printing station 93, which can print labels and/or other materials onto the resultant laminate 22 (e.g., onto the exposed portions of the base web 32) with a rotary printer as shown in FIG. 1. Alternatively, the labels could be printed with any suitable printing apparatus or the labels could be pre-printed labels that are adhered and/or laminated onto the resultant laminate 22. In one exemplary embodiment, the printing station 93 and/or other suitable features could form registration marks and/or cutouts (not shown) in the resultant laminate 22. The printing station 93 could be otherwise arranged, positioned, and/or configured or could be omitted without departing from the disclosure.

As shown in FIG. 1, a web of covering material 94 (e.g., a barrier web) can be secured to the resultant laminate 22. For example, the barrier web 94 may be a barrier layer of material such as polymer film, or more specifically a polyethylene terephthalate film, or any other suitable material. In one embodiment, the barrier web 94 can be drawn from a supply roll 95 through one or more adhesive applicators 96, which can apply an adhesive material 97 to the interior surface of the barrier web 94 (FIG. 1). Alternatively, the adhesive 97 could be applied to the resultant laminate 22 prior to the application of the barrier web 94 or could be present on the barrier web 94 prior to being drawn from the supply roll 95. The barrier web 94 with the adhesive 97 and the resultant laminate 22 can be nipped together by a pair of nip rollers 98 to at least partially bond the barrier web 94 to the resultant laminate 22.

The resultant laminate 22 can be formed into a roll (not shown), and thereafter drawn from the roll and formed into constructs (not shown). The roll may be characterized as being a conventional or other suitable winding apparatus for forming the resultant laminate 22 into a roll. The forming of the resultant laminate 22 into constructs may be performed in any suitable manner. For example, the resultant laminate 22 may be formed into constructs such as, but not limited to, blanks, cartons, trays, bowls, press-formed constructs, or the like.

The system 20 generally can be simpler and/or require less room than alternative methods of removing the scrap sections 54 (e.g., chemical etching and/or chemical deactivation). In one alternative system, a pattern of adhesive can be applied to the initial laminate 24 and/or the sacrificial web 62 so that the sacrificial web 62 is only glued to the scrap sections 54 of the initial laminate 24. However, a station that has the capability of applying patterned, registered adhesive to the sacrificial web and/or the initial laminate might not be practical and/or desired with a particular system. The combination of the nip roller 66 with raised features 74 in phase with the scrap sections 54 of the initial laminate 24 and the sacrificial web 62 having substantially one whole face coated with adhesive (e.g., according to the illustrated embodiment) can remove the scrap sections to form the resultant laminate 22 in a relative simple and compact system.

In alternative embodiments, the interactive web 34 and retained interactive sections 52 could be inverted relative to the other layers of the resultant laminate 22. Further any of the layers could be omitted and/or other layers or webs may be included in the resultant laminates. The above-disclosed patterns (e.g., of the retained interactive sections 52) are provided as schematic examples only, and other patterns are within the scope of this disclosure. For example, one or more of the above-discussed patterns (e.g., of the retained interactive sections 52) may be tailored to the desired end uses of the resultant laminates 22. Additionally, the compound laminate 28 could be formed in a different order. For example, the interactive web 34 could be applied to the sacrificial web 62 (e.g., the scrap interactive sections 54 could be bonded to the sacrificial web 62), and then the base web 32 could be applied to the interactive web 34 (e.g., the retained interactive sections 52 could be bonded to the base web 32) prior to separating the sacrificial web 76 and the resultant laminate 22. In addition, any type of laminate could be formed by the system 20 and the associated method. For example, the interactive web or laminate 34 could be any type of layer, laminate, and/or web that is removed from the base web 32 or another base layer in a predetermined pattern.

Figure 4:
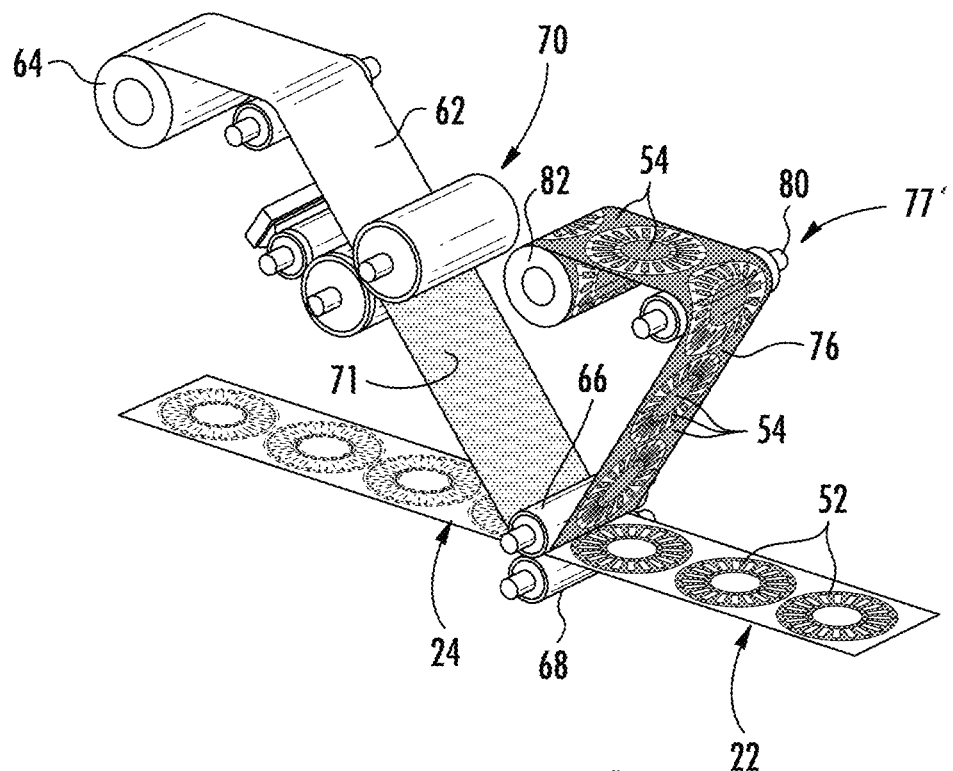
FIG. 4 is a schematic perspective view of a modified portion of the system of FIG. 1 showing the separation of a sacrificial laminate and a resultant according to an alternative embodiment.

In an alternative embodiment shown schematically in FIG. 4, an alternative peel-away apparatus 77' omits the peel-away roller 78 and separates the sacrificial web 76 from the resultant web 22 at the nip roller 66. Accordingly, the peel-away roller 78 could be combined with the nip roller 66 so that the sacrificial laminate 76 is drawn in an at least partially transverse direction with respect to the downstream direction D1 over the guide roller 80 from the nip roller 66. As shown in FIG. 4, the sacrificial laminate 76 can delaminate and peel away from the resultant laminate 22 at the nip roller/peel-away roller 66 after the sacrificial web 62 is nipped to the scrap interactive sections 54.

In the alternative embodiment, the sacrificial web 62 can be in contact with the nip roller/peel-away roller 66 prior to contacting the initial laminate 24 between the nip rollers 66, 68 and can remain in contact with the nip roller/peel-away roller 66 after passing between the nip rollers 66, 68 (FIG. 4) as the sacrificial web 62 is pulled upwardly over the guide roller 80. As the sacrificial web 62 travels generally upwardly on the nip roller/peel-away roller 66, the scrap interactive sections 54 remain adhered to the sacrificial web 62 by adhesive 70 since the scrap interactive sections 54 are not adhered to the base web 32 by the adhesive segments 50. Accordingly, the scrap interactive sections 54 are removed from the resultant laminate 22 by the sacrificial web 62 (FIG. 4).

Figure 5:
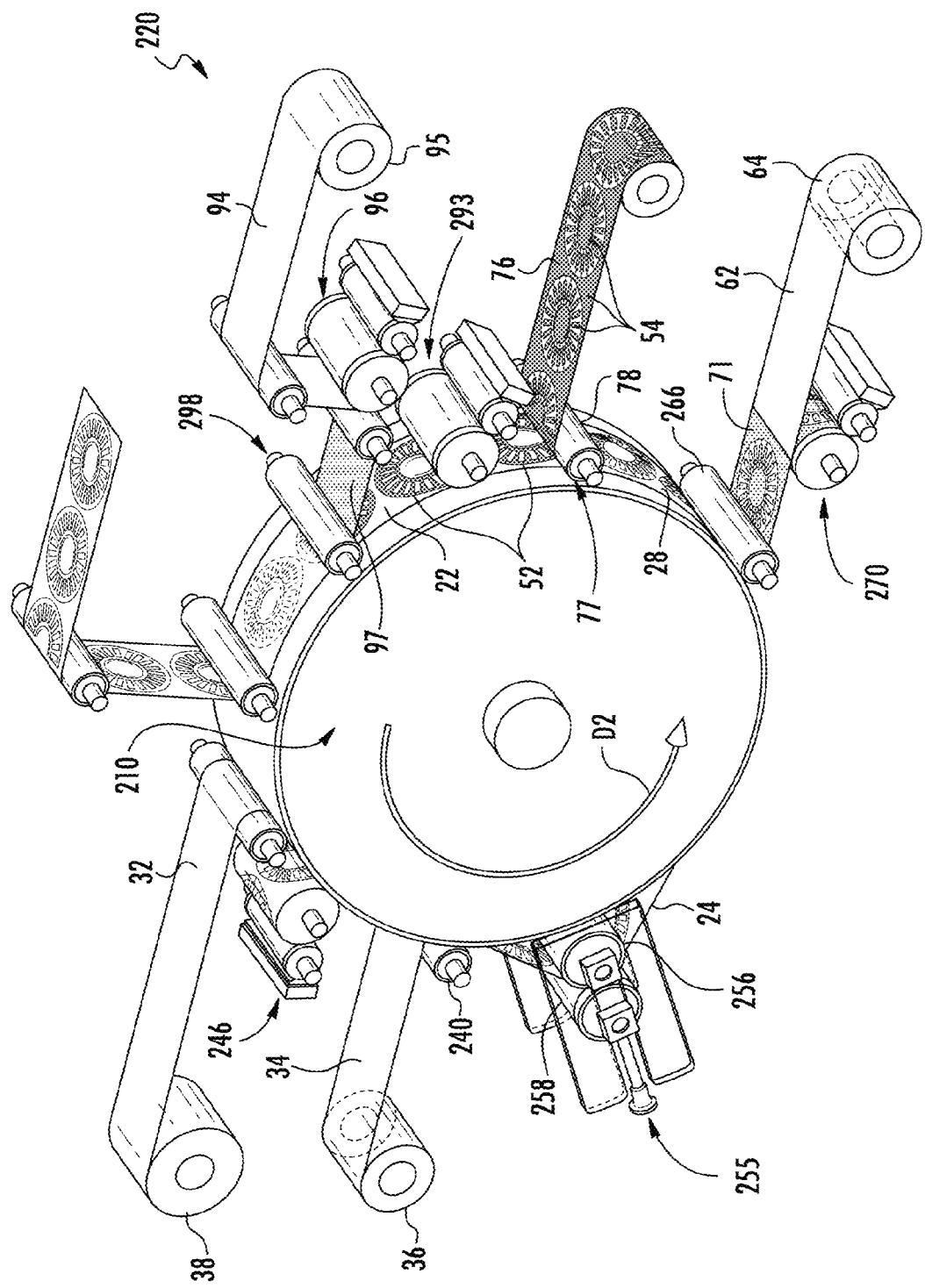
FIG. 5 is a schematic perspective view of a system for forming a resultant laminate in accordance with a second exemplary embodiment of the disclosure.
Figure 6:
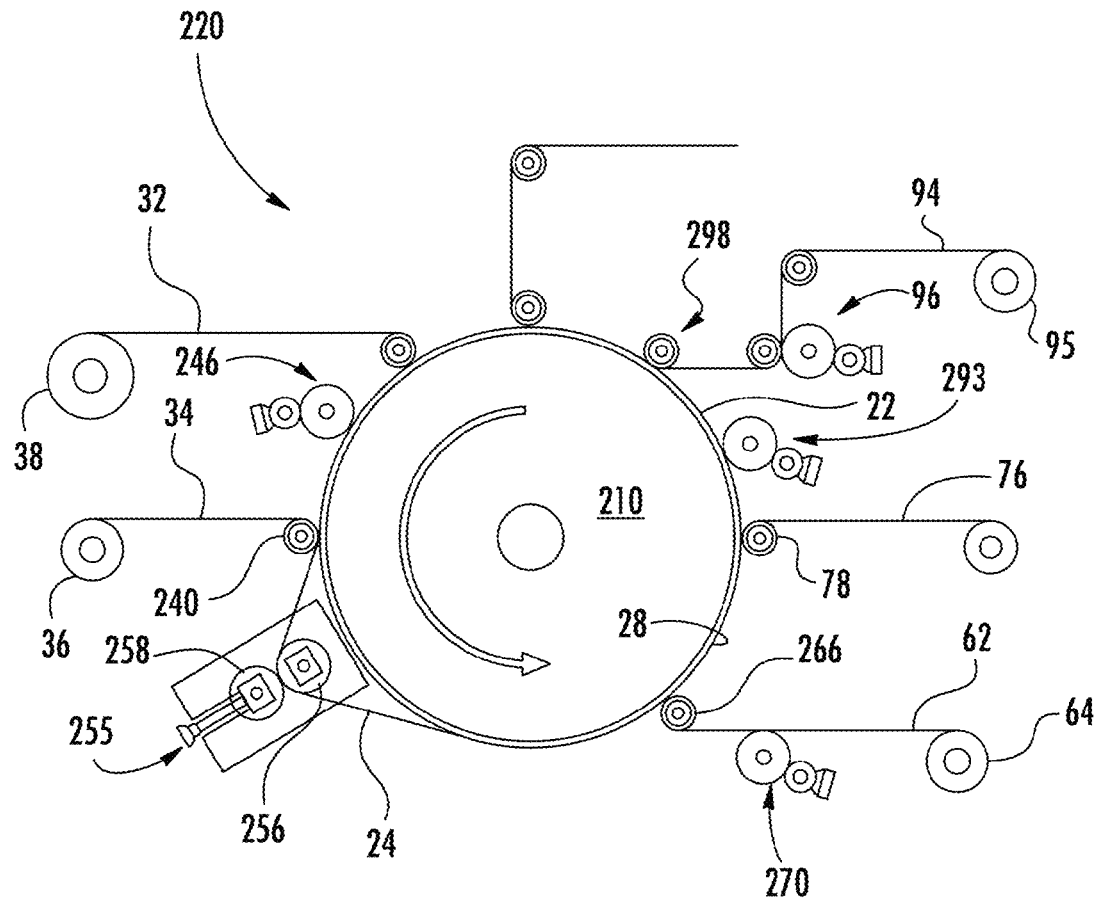
FIG. 6 is a schematic side view of the system of FIG. 5.

FIGS. 5 and 6 are views of a system 220 for forming the resultant laminate 22 according to a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. As shown in FIGS. 5 and 6, the system 220 is arranged around a central drum 210. According, the drum 210 can rotate about its axis in order to carry the base web 32, the initial laminate 24, the compound laminate 28, and the resultant laminate 22 in the downstream direction D2 as the resultant laminate 22 is formed by the system 220. In one embodiment, the central drum 210 generally can replace the lower nip rollers and the counter rollers (e.g., for the adhesive applicator and the printing stations). For example, the surface of the central drum 210 can act as the opposing support surface for the nip roller 266 and the raised features 74 of the nip roller 266. Accordingly, in one embodiment, the sacrificial web 62, the adhesive 71, the scrap interactive sections 54, and the base web 32 are nipped between the nip roller 266 and the central drum 210 to form the compound laminate 28 and to at least partially bond the scrap interactive sections 54 to the sacrificial web 62.

In operation, the resultant laminate 22 generally is formed in a similar manner as described above with respect to the generally horizontal system 20 of the first embodiment. For example, the base web 32 is received between the adhesive applicator 246 and the central drum 210 and the adhesive pattern 47 is applied to the base web 32 by the adhesive applicator 246. The interactive web 34 and the base web 32 can be received and nipped together between the nip roller 240 and the central drum 210, and the kisscut pattern can be formed in the interactive web 34 at a cutting station 255. In the embodiment shown in FIGS. 5 and 6, the cutting station 255 includes a counter roller 256 and a cutting roller 258 arranged so that the initial laminate 24 separates from the central drum 210 to be received between the cutting roller 258 and the counter roller 256. In an alternative embodiment, the counter roller 256 could be omitted so that the initial laminate 24 is received between the cutting roller 258 and the central drum 210 for forming the kisscut pattern in the interactive web 34.

In the embodiment shown in FIG. 5, the adhesive applicator 70 can apply the adhesive 71 to the sacrificial web 62 in an adhesive pattern corresponding to the pattern of the scrap interactive sections 54 of the interactive web 34. Alternatively, the adhesive 71 could be applied substantially uniformly to the sacrificial web 62. The nip roller 266 can help bond the sacrificial web 62 to the scrap interactive sections 54 of the interactive web 34 with raised features 74 (e.g., as schematically shown in FIG. 3 in relation to the first embodiment) nipping the sacrificial web 62 to the scrap interactive sections 54 against the opposing support surface of the central drum 210. The compound laminate 28 can be separated into the sacrificial laminate 76 and the resultant laminate 22 at the peel-away apparatus 77, and labels can be printed onto/applied to the resultant laminate 22 at the printing station 293. Adhesive 97 can be applied to the barrier web 94 by the adhesive applicator 96, and the barrier web 94 and the resultant laminate 22 can be nipped together between the nip roller 298 and the central drum 210. The resultant laminate can be moved away from the drum 210 and the system 220 over guide rollers for further processing and/or to be formed onto a roll (not shown). Any of the features of the system 220 could be otherwise shaped, arranged, positioned, and/or configured or could be omitted without departing from the disclosure.

In an exemplary alternative embodiment, the peel-away apparatus 77 could be replaced by an alternative peel-away apparatus (not shown) that is similar to the alternative peel-away apparatus 77' as shown in FIG. 4. For example, the alternative peel-away apparatus for the system 220 could omit the peel-away roller 78 so that the compound laminate 28 is separated into the sacrificial laminate 76 and the resultant laminate 22 at the nip roller 266 after the sacrificial web 62 and the scrap interactive sections 54 are nipped together between the nip roller 266 and the central drum 210. Accordingly, in the alternative peel-away apparatus, the sacrificial web 76 can be drawn away from the central drum 210 and the resultant laminate 22 at the nip roller 266.

In general, microwave ovens provide a convenient means of cooking and reheating food items. Many combinations of materials of different character have been used in microwave packaging to influence the effect of the microwave energy on the food product being heated. These microwave packaging materials may be microwave transparent, for example, paper, paperboard, or many plastics, or they may be microwave energy interactive, for example, metal foils or thin metal deposits. Microwave transparent materials generally provide, for example, food product support, packaging form, insulation, and/or vapor barrier functions in packaging. Microwave energy interactive material generally provides, for example, enhanced surface heating, microwave shielding, enhanced microwave transmission, and/or energy distribution functions in packaging.

Microwave packaging can be created and configured of both microwave transparent and microwave energy interactive materials. For example, MicroRite brand trays, which are available from Graphic Packaging International, Inc., comprise aluminum foil laminated to paperboard. The aluminum foil can be configured in predetermined shapes that define a pattern. In some embodiments, the shapes and/or pattern may be formed by chemically etching away (in a caustic bath) some of the foil and/or chemical deactivation of some of the foil. In some embodiments, the configuration of the microwave energy interactive material determines the performance characteristics of the microwave energy interactive material.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method for forming a laminate, the method comprising:
   moving an initial laminate and a sacrificial web in a downstream direction, the initial laminate comprising a base web and an interactive web, the interactive web comprising a retained section and a scrap section, and the sacrificial web being at least partially coated with an adhesive;
   receiving the sacrificial web and the initial laminate between a nip roller and an opposing support surface, the nip roller comprising a raised feature and a recess;
   forming a compound laminate comprising the sacrificial web and the initial laminate, the forming the compound laminate comprising nipping the sacrificial web and at least the scrap section of the interactive web between the raised feature of the nip roller and the opposing support surface so that the adhesive at least partially bonds the sacrificial web to the scrap section; and
   separating the compound laminate into a resultant laminate and a sacrificial laminate, the resultant laminate comprising the base web and at least the retained section of the interactive web and the sacrificial laminate comprising the sacrificial web and at least the scrap section of the interactive web.

2. The method of claim 1, wherein the separating the compound laminate comprises moving the sacrificial web away from the resultant laminate.

3. The method of claim 1, wherein at least the retained section of the interactive web is at least partially bonded to the base web prior to the receiving the sacrificial web and the initial laminate between the nip roller and the opposing support surface.

4. The method of claim 1, further comprising aligning the recess of the nip roller with at least a portion of the retained section of the interactive web during the nipping the sacrificial web and at least the scrap section of the interactive web.

5. The method of claim 1, wherein the interactive web comprises a plurality of retained sections and the nip roller comprises a plurality of recesses, the recesses of the plurality of recesses being aligned with at least a portion of respective retained sections of the plurality of retained sections during the nipping the sacrificial web and at least the scrap section of the initial laminate.

6. The method of claim 1, wherein the interactive web comprises a plurality of scrap sections and the nip roller comprises a plurality of raised features, and the nipping the sacrificial web and at least the scrap section of the interactive web comprises engaging the raised features of the plurality of raised features with respective scrap section of the plurality scrap sections so that the adhesive at least partially bonds the sacrificial web to the plurality of scrap sections.

7. The method of claim 1, further comprising applying the adhesive to the sacrificial web so that the sacrificial web is generally homogenously coated with adhesive prior to the receiving the sacrificial web and the initial laminate between a nip roller and an opposing support surface.

8. The method of claim 1, further comprising applying the adhesive to the sacrificial web in an adhesive pattern prior to the receiving the sacrificial web and the initial laminate between a nip roller and an opposing support surface, wherein the adhesive pattern is at least partially aligned with the scrap section during the receiving the sacrificial web and the initial laminate between a nip roller and an opposing support surface.

9. The method of claim 1, wherein the nip roller is a first nip roller and the opposing support surface is a second nip roller disposed opposite to the first nip roller.

10. The method of claim 1, wherein the moving the initial laminate and the sacrificial web in the downstream direction comprises moving at least the initial laminate along an outer surface of a central drum, the nip roller is disposed adjacent the central drum with the initial laminate and the sacrificial web disposed between the outer surface of the central drum and the nip roller, and the outer surface of the central drum comprises the opposing support surface.

11. The method of claim 1, wherein the separating the compound laminate into the resultant laminate and the sacrificial laminate comprises moving the sacrificial web in an at least partially transverse direction with respect to the downstream direction while moving the resultant laminate in the downstream direction from the nip roller.

12. The method of claim 11, further comprising moving the compound laminate in the downstream direction from the nip roller to a nip roller prior to the separating the compound laminate into the resultant laminate and the sacrificial laminate, wherein the moving the sacrificial web in the at least partially transverse direction comprises moving the sacrificial web along a peel-away roller that is spaced apart from the nip roller in the downstream direction.

13. A system for forming a laminate, the system comprising:
   a nip roller comprising a raised feature and a recess;
   an opposing support surface disposed opposite the nip roller, the nip roller and the opposing support surface being for receiving an initial laminate and a sacrificial web between the nip roller and the opposing support surface, the initial laminate comprising a base web and an interactive web, the interactive web comprising a retained section and a scrap section, and the sacrificial web being at least partially coated with an adhesive, wherein the raised portion of the nip roller is for being generally aligned with the scrap section of the interactive web so that the sacrificial web is nipped to at least a portion of the scrap section; and
   a peel-away apparatus for separating the sacrificial web and the scrap section from the base web and the retained section.

14. The system of claim 13, wherein the peel-away apparatus is for moving the sacrificial web away from the resultant laminate.

15. The system of claim 13, wherein at least a portion of the recess of the nip roller is for being aligned with at least a portion of the retained section of the interactive web.

16. The system of claim 13, wherein the nip roller comprises a plurality of recesses for being aligned with respective retained sections of a plurality of retained sections of the interactive web.

17. The system of claim 13, wherein the nip roller comprises a plurality of raised features for engaging respective scrap sections of a plurality of scrap sections of the interactive web.

18. The system of claim 13, further comprising an adhesive applicator engaging the sacrificial web for applying the adhesive to the sacrificial web so that the sacrificial web is generally homogenously coated with adhesive.

19. The system of claim 13, further comprising an adhesive applicator engaging the sacrificial web for applying the adhesive to the sacrificial web in an adhesive pattern, wherein the adhesive pattern is for being at least partially aligned with the scrap section of the interactive web.

20. The system of claim 13, wherein the nip roller is a first nip roller and the opposing support surface is a second nip roller disposed opposite to the first nip roller.

21. The system of claim 13, further comprising a central drum for moving at least the initial laminate in a downstream direction, wherein the nip roller is disposed adjacent the central drum, the initial laminate and the sacrificial web are for being disposed between an outer surface of the central drum and the nip roller, and the outer surface of the central drum comprises the opposing support surface.

22. The system of claim 13, wherein the peel-away apparatus is for moving the sacrificial web in an at least partially transverse direction with respect to a downstream direction while moving the resultant laminate in the downstream direction from the nip roller.

23. The system of claim 22, wherein the peel-away apparatus comprises a peel-away roller disposed in the downstream direction from the nip roller.

* * * * *